(12) United States Patent
Cola et al.

(10) Patent No.: US 11,047,294 B2
(45) Date of Patent: Jun. 29, 2021

(54) METHOD OF CONTROLLING A VALVE OF A DUAL VOLUTE TURBOCHARGER

(71) Applicant: BorgWarner Inc., Auburn Hills, MI (US)

(72) Inventors: Michael Daniel Cola, Fletcher, NC (US); Sascha Weiske, Weilerbach (DE); Mehul Sonigra, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/788,891

(22) Filed: Feb. 12, 2020

(65) Prior Publication Data

US 2020/0263598 A1    Aug. 20, 2020

Related U.S. Application Data

(60) Provisional application No. 62/962,321, filed on Jan. 17, 2020, provisional application No. 62/806,396, filed on Feb. 15, 2019.

(51) Int. Cl.
*F02B 37/18* (2006.01)
*F02B 33/40* (2006.01)
(Continued)

(52) U.S. Cl.
CPC ............ *F02B 37/183* (2013.01); *F02B 33/40* (2013.01); *F02D 23/00* (2013.01);
(Continued)

(58) Field of Classification Search
CPC ...... F02B 37/183; F02B 33/40; F02B 37/186; F02B 37/22; F02B 2037/122;
(Continued)

(56) References Cited

U.S. PATENT DOCUMENTS 3,423,926 A * 1/1969 Holzhausen .......... F02B 37/025
60/615
6,250,079 B1    6/2001 Zander et al.
(Continued)

FOREIGN PATENT DOCUMENTS

DE          19826355 A1    12/1999
DE      102006046826 A1     4/2008
(Continued)

OTHER PUBLICATIONS

Machine-assisted English language abstract for DE 20 2018 104 140 extracted from espacenet.com database on Jun. 24, 2020, 3 pages.
(Continued)

*Primary Examiner* — Audrey K Bradley
*Assistant Examiner* — Edward Bushard
(74) *Attorney, Agent, or Firm* — Howard & Howard Attorneys PLLC

(57) ABSTRACT

A dual volute turbocharger for use with an internal combustion engine includes a valve for controlling exhaust gas flow to a turbine housing interior of the dual volute turbocharger. The dual volute turbocharger also includes a first volute and a second volute each adapted for fluid communication with the internal combustion engine. The dual volute turbocharger further includes a wall separating the first and second volutes and a valve seat. The valve seat and the wall collectively define a valve cavity. The valve is movable between a closed position and an open position. The valve and the wall of the turbine housing collectively define a first cross-sectional flow area. The valve and the valve seat collectively define a second cross-sectional flow area. A method of controlling the valve of the dual volute turbocharger is also disclosed.

11 Claims, 9 Drawing Sheets

(51) Int. Cl.
*F02D 23/00* (2006.01)
*F02D 41/00* (2006.01)
*F02D 41/14* (2006.01)

(52) U.S. Cl.
CPC ..... *F02D 41/0007* (2013.01); *F02D 41/1446* (2013.01); *F02D 41/1448* (2013.01)

(58) Field of Classification Search
CPC .............. F02B 37/025; F02D 41/1448; F02D 41/1446; F02D 41/0007; F02D 23/00; F02D 41/1445; F02D 35/0023; F01D 17/04; F01D 17/08; F01D 17/105; F01D 17/145; F01D 9/026; F05D 2270/301; F05D 2270/303; F05D 2270/20; F05D 2270/07; F05D 2240/14; F05D 2220/40; F16K 11/161; F16K 37/005; F16K 37/0041

See application file for complete search history.

(56) References Cited

U.S. PATENT DOCUMENTS

| | | |
|---|---|---|
| 6,672,061 B2 | 1/2004 | Schmid et al. |
| 6,969,048 B2 | 11/2005 | Colic et al. |
| 7,934,379 B2 | 5/2011 | Kuspert et al. |
| 8,499,557 B2 | 8/2013 | Grabowska |
| 9,359,939 B2 | 6/2016 | Kindl et al. |
| 9,556,786 B2 | 1/2017 | Marques et al. |
| 9,810,143 B2 | 11/2017 | McConville et al. |
| 10,006,342 B2 | 6/2018 | Smiljanovski et al. |
| 10,030,518 B2 | 7/2018 | Lummer et al. |
| 10,119,549 B2 | 11/2018 | Tschirschke |
| 2004/0244373 A1 | 12/2004 | Frankenstein et al. |
| 2007/0119170 A1 | 5/2007 | Masson et al. |
| 2012/0060494 A1 | 3/2012 | Sato et al. |
| 2015/0292394 A1 | 10/2015 | Uibelhoer et al. |
| 2017/0234435 A1 | 8/2017 | Hermann et al. |
| 2017/0241329 A1 | 8/2017 | Uehane et al. |
| 2018/0328217 A1 | 11/2018 | Walkingshaw et al. |
| 2018/0328268 A1 | 11/2018 | Babak |
| 2019/0301355 A1 | 10/2019 | Walkingshaw et al. |
| 2020/0141309 A1 | 5/2020 | Reif et al. |

FOREIGN PATENT DOCUMENTS

| | | |
|---|---|---|
| DE | 102010008411 A1 | 8/2011 |
| DE | 102013002894 A1 | 9/2014 |
| DE | 112013002306 T5 | 2/2015 |
| DE | 102015011256 A1 | 3/2016 |
| DE | 102016100329 A1 | 7/2016 |
| DE | 102015209044 A1 | 11/2016 |
| DE | 102015122351 A1 | 6/2017 |
| DE | 102016103145 A1 | 8/2017 |
| DE | 202018101705 U1 | 4/2018 |
| DE | 202018104140 U1 | 7/2018 |
| EP | 1939427 B1 | 2/2012 |
| EP | 2444626 A1 | 4/2012 |
| EP | 2708717 B1 | 9/2015 |
| EP | 2803838 B1 | 9/2016 |
| JP | 2009024584 A | 2/2009 |
| WO | 2007060831 A1 | 5/2007 |
| WO | 2011101005 A1 | 8/2011 |
| WO | 2016094268 A1 | 6/2016 |
| WO | 2017102040 A1 | 6/2017 |

OTHER PUBLICATIONS

English language abstract and machine-assisted English translation for DE 198 26 355 extracted from espacenet.com database on May 27, 2020, 8 pages.
English language abstract and machine-assisted English translation for JP 2009-024584 extracted from espacenet.com database on May 20, 2020, 15 pages.
U.S. Appl. No. 16/788,927, filed Feb. 12, 2020, 34 pages.
U.S. Appl. No. 16/790,087, filed Feb. 13, 2020, 58 pages.
United States Provisional U.S. Appl. No. 62/806,396, filed Feb. 15, 2019, 43 pages.
United States Provisional U.S. Appl. No. 62/806,434, filed Feb. 15, 2019, 41 pages.
English language abstract and machine-assisted English translation for DE 10 2006 046 826 extracted from espacenet.com database on Feb. 26, 2020, 7 pages.
English language abstract and machine-assisted English translation for DE 10 2010 008 411 extracted from espacenet.com database on Feb. 26, 2020, 9 pages.
English language abstract and machine-assisted English translation for DE 10 2013 002 894 extracted from espacenet.com database on Feb. 26, 2020, 8 pages.
English language abstract for DE 11 2013 002 306 extracted from espacenet.com database on Feb. 26, 2020, 1 page.
English language abstract and machine-assisted English translation for DE 10 2015 011 256 extracted from espacenet.com database on Feb. 26, 2020, 13 pages.
English language abstract for DE 10 2015 122 351 extracted from espacenet.com database on Feb. 26, 2020, 2 pages.
English language abstract and machine-assisted English translation for DE 10 2016 103 145 extracted from espacenet.com database on Feb. 26, 2020, 14 pages.
English language abstract and machine-assisted English translation for DE 10 2015 209 044 extracted from espacenet.com database on Feb. 26, 2020, 11 pages.
English language abstract for DE 20 2018 101 705 extracted from espacenet.com database on Feb. 26, 2020, 2 pages.
English language abstract and machine-assisted English translation for EP 1 939 427 extracted from espacenet.com database on Feb. 26, 2020, 13 pages.
English language abstract and machine-assisted English translation for EP 2 803 838 extracted from espacenet.com database on Feb. 26, 2020, 11 pages.
English language abstract and machine-assisted English translation for WO 2011/101005 extracted from espacenet.com database on Feb. 26, 2020, 6 pages.
English language abstract and machine-assisted English translation for WO 2017/102040 extracted from espacenet.com database on Feb. 26, 2020, 6 pages.
Machine-assisted English language abstract for DE 10 2016 100 329 A1 extracted from espacenet.com database on May 6, 2021, 2 pages.
BorgWarner, "News Relsease: BorgWarner Introduces Dual Volute Turbocharger for Gasoline Engines", https://cdn.borgwarner.com/docs/default-sourrce/press-release-downloads/borgwarner-introduces-dual-volute-turbocharger-for-gasoline-enginesfba3d8c4e9169aab321ff0400c8ba1a.pdf?sfvrsn=4232b63c_2, Sep. 6, 2018, 9 pages.
Borgwarner, "Performance Turbocharger Catalog", http://www.turbotekniikka.fi/PerformanceTurbochargerCatalog.pdf, Jan. 1, 2011, 12 pages.

* cited by examiner

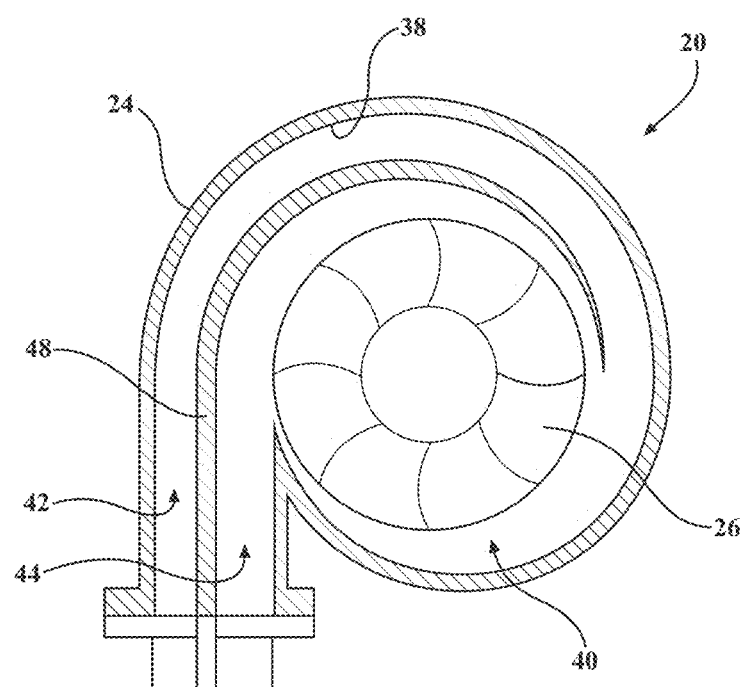
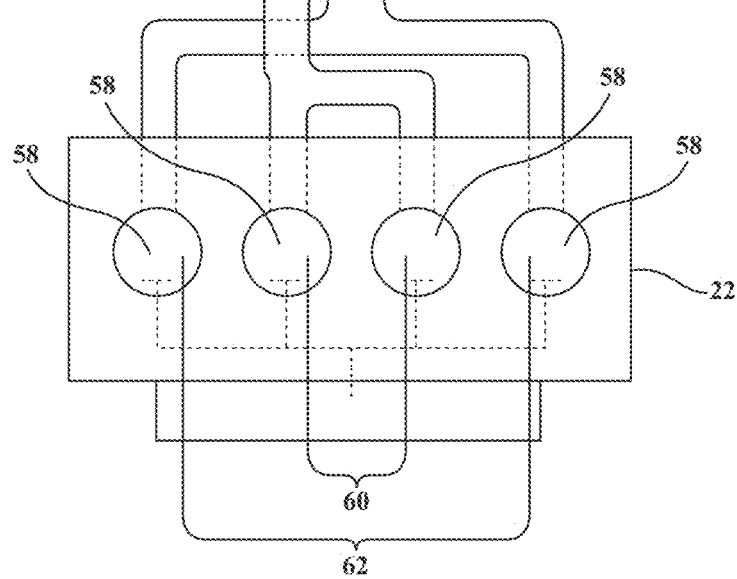
FIG. 2

METHOD OF CONTROLLING A VALVE OF A DUAL VOLUTE TURBOCHARGER

CROSS-REFERENCE TO RELATED APPLICATIONS

The subject patent application claims priority to and all the benefits of U.S. Provisional Patent Application No. 62/806,396 filed Feb. 15, 2019 and U.S. Provisional Patent Application No. 62/962,321 filed on Jan. 17, 2020, the disclosures of which are herein incorporated by reference in their entirety.

BACKGROUND OF THE INVENTION

1. Field of the Invention

The present invention generally relates to a method of controlling a valve of a dual volute turbocharger.

2. Description of the Related Art

Dual volute turbochargers receive exhaust gas from an internal combustion engine and deliver compressed air to the internal combustion engine. Dual volute turbochargers are used to increase power output of the internal combustion engine, lower fuel consumption of the internal combustion engine, and reduce emissions produced by the internal combustion engine. Delivery of compressed air to the internal combustion engine by the dual volute turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Dual volute turbochargers include a turbine housing. The turbine housing includes a turbine housing interior, a first volute, a second volute, and a turbine housing outlet. The first and second volutes are each adapted for fluid communication with the internal combustion engine and the turbine housing interior for delivering exhaust gas from the internal combustion engine to the turbine housing interior. The turbine housing also includes a wall separating the first and second volutes. The turbine housing also includes a valve seat.

Dual turbochargers also include a valve engageable with at least one of the valve seat and the wall of the turbine housing for controlling exhaust gas flow from the first and second volutes to the turbine housing interior. The valve is movable between a closed position and an open position. In the closed position the valve restricts exhaust gas from flowing between the first and second volutes. In the open position the valve allows exhaust gas from the first and second volutes to bypass said turbine housing interior.

In recent years, there has been a desire to increase the efficiency and overall performance of dual volute turbochargers. To help increase the efficiency and performance of the turbocharger, there has been a desire to improve methods of controlling the valve of the dual volute turbocharger. Conventional methods of controlling the valve fail to balance a desire to efficiently utilize pulse energy associated with exhaust gas flowing through one of the first and second volutes with a desire to reduce backpressure on the internal combustion engine. Moreover, conventional methods of controlling the valve fail to optimize a brake-specific fuel consumption of the internal combustion engine.

As such, there remains a need to provide an improved method for controlling a valve of a dual volute turbocharger.

SUMMARY OF THE INVENTION AND ADVANTAGES

A dual volute turbocharger for use with an internal combustion engine is configured to deliver compressed air to the internal combustion engine and receive exhaust gas from the internal combustion engine. The dual volute turbocharger includes a turbine housing. The turbine housing includes a turbine housing interior, a first volute, a second volute, and a turbine housing outlet. The turbine housing interior is adapted to receive a turbine wheel. The first and second volutes are each adapted for fluid communication with the internal combustion engine and the turbine housing interior for delivering exhaust gas from the internal combustion engine to the turbine housing interior. The turbine housing outlet is in fluid communication with the turbine housing interior for discharging exhaust gas from the turbine housing interior. The turbine housing also includes a wall separating the first volute from the second volute. The turbine housing further includes a valve seat.

The dual volute turbocharger also includes a valve engageable with at least one of the valve seat and the wall of the turbine housing for controlling exhaust gas flow from the first and second volutes to the turbine housing interior. The valve and the wall of the turbine housing collectively define a first cross-sectional flow area and the valve and the valve seat of the turbine housing collectively define a second cross-sectional flow area. The valve is movable between a closed position and an open position. In the closed position the valve restricts exhaust gas from flowing between the first and second volutes. In the open position the valve allows exhaust gas from the first and second volutes to bypass the turbine housing interior.

The dual volute turbocharger further includes a controller. The controller is operable to receive at least one signal from at least one sensor and to direct the valve based on the at least one signal. In one embodiment, the at least one signal corresponds to an operating value related to the internal combustion engine and/or the dual volute turbocharger, and the at least one signal may also correspond to a turbine energy of the dual volute turbocharger. In another embodiment, the at least one signal corresponds to an operating value related to a brake-specific fuel consumption (BSFC) of the internal combustion engine.

In embodiments where the controller receives the at least one signal corresponding to the operating value related to the internal combustion engine and/or the dual volute turbocharger and the turbine energy of the dual volute turbocharger, a method of controlling the valve of the dual volute turbocharger includes the step of determining a current position of the valve. The method also includes the step of determining the operating value and determining the turbine energy of the dual volute turbocharger. The method further includes the step of determining a desired position for the valve between the open and closed positions based on the operating value and the turbine energy of the dual volute turbocharger for providing a desired flow of exhaust gas from the internal combustion engine to the turbine housing interior. The method additionally includes the step of comparing the current position and the desired position, and directing the valve based on the comparison of the current position and the desired position to provide a desired flow of exhaust gas from the internal combustion engine to the turbine housing interior.

In embodiments where the controller receives the at least one signal corresponding to the operating value related to the BSFC of the internal combustion engine, a method of controlling the valve of the dual volute turbocharger includes determining a current position of the valve. The method also includes the step of determining the operating value. The method further includes the step of determining a desired position for the valve between the closed and open positions based on the operating value for optimizing the BSFC of the internal combustion engine. The method also additionally includes the steps of comparing the current position and the desired position, and directing the valve based on the comparison of the current position and the desired position to optimize the BSFC of the internal combustion engine.

Accordingly, when the controller receives the first signal corresponding to the operating value related to the internal combustion engine and/or the dual volute turbocharger and the second signal corresponding to the turbine energy of the dual volute turbocharger, the method of controlling the valve efficiently utilizes pulse energy associated with exhaust gas flowing through one of the first and second volutes. The method of controlling the valve also reduces backpressure on the internal combustion engine, thereby reducing the risk of damage to the internal combustion engine during operation of the dual volute turbocharger. Moreover, when the controller receives the signal corresponding to the operating value related to the BSFC of the internal combustion engine, the method of controlling the valve optimizes the BSFC of the internal combustion engine. This optimization of the BSFC lowers fuel consumption of the internal combustion engine during operation of the internal combustion engine and the dual volute turbocharger.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a schematic representation of the internal combustion engine and of a turbine housing of the dual volute turbocharger, with the turbine housing including a first volute, a second volute, and a turbine housing interior, and with the first and second volutes adapted for fluid communication with the internal combustion engine;

DETAILED DESCRIPTION OF THE INVENTION

Figure 1:
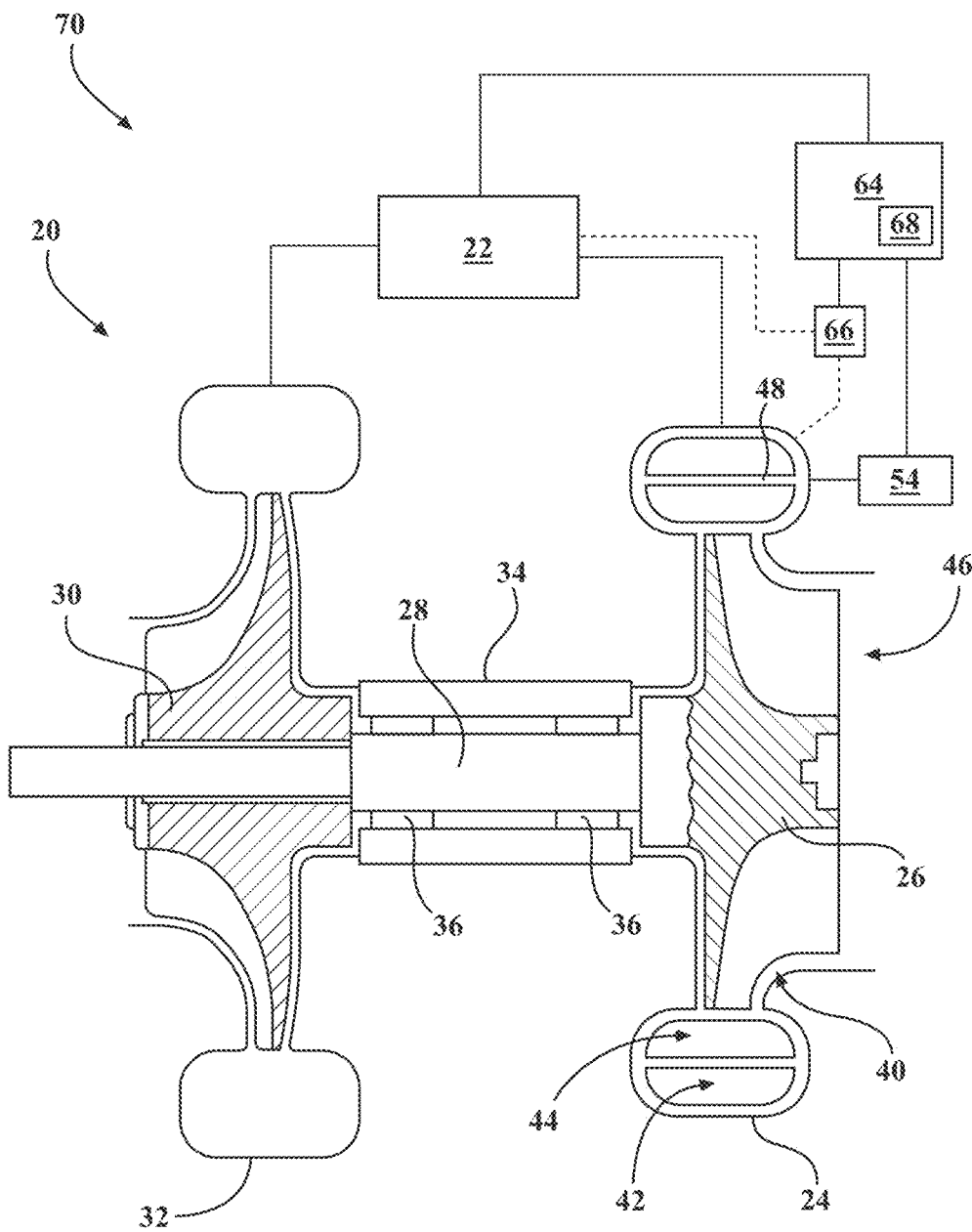
FIG. 1 is a schematic representation of an internal combustion engine, a controller, and a dual volute turbocharger including a valve.

With reference to the Figures, wherein like numerals indicate like parts throughout the several views, a schematic representation of a dual volute turbocharger 20 configured to receive exhaust gas from an internal combustion engine 22 and deliver compressed air to the internal combustion engine 22 is shown in FIG. 1. Although not required, the dual volute turbocharger 20 is typically used in passenger and commercial automotive applications. However, it is to be appreciated that the dual volute turbocharger 20 may be used in non-automotive applications such as heavy equipment applications, non-automotive diesel engine applications, non-automotive motor applications, and the like. As shown in FIGS. 1 and 2, the dual volute turbocharger 20 includes a turbine housing 24 and a turbine wheel 26 disposed in the turbine housing 24.

With reference again to FIG. 1, the dual volute turbocharger 20 typically includes a turbocharger shaft 28, a compressor wheel 30, a compressor housing 34, and a bearing housing 36. During operation of the dual volute turbocharger 20, the turbine wheel 26 receives exhaust gas from the internal combustion engine 22 which causes the turbine wheel 26 to rotate. The turbocharger shaft 28 is coupled to and rotatable by the turbine wheel 26. The compressor wheel 30 is coupled to the turbocharger shaft 28 and is rotatable by the turbocharger shaft 28 for delivering compressed air to the internal combustion engine 22. The compressor wheel 30 is disposed in the compressor housing 34. The bearing housing 36 extends about the turbocharger shaft 28 between the turbine wheel 26 and the compressor wheel 30. The dual volute turbocharger 20 also typically includes bearings 36 disposed about the turbocharger shaft 28 and in the bearing housing 36 for rotatably supporting the turbocharger shaft 28.

Figure 3A:
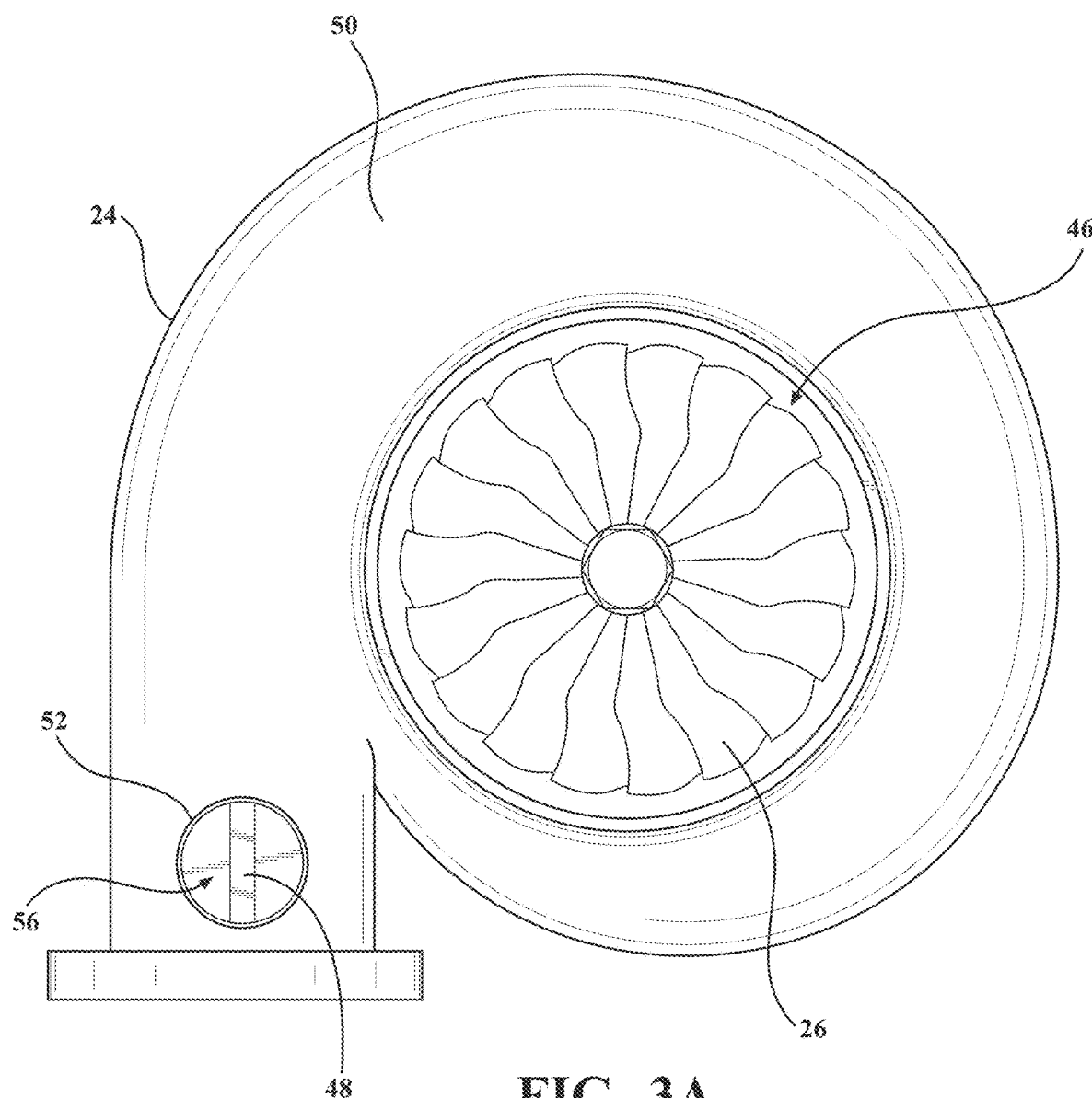
FIG. 3A is a top view of the turbine housing according to one embodiment, with the turbine housing including a wall and valve seat, with the valve seat included on an exterior surface of the turbine housing, and with the wall and the valve seat collectively defining a valve cavity.
Figure 3B:
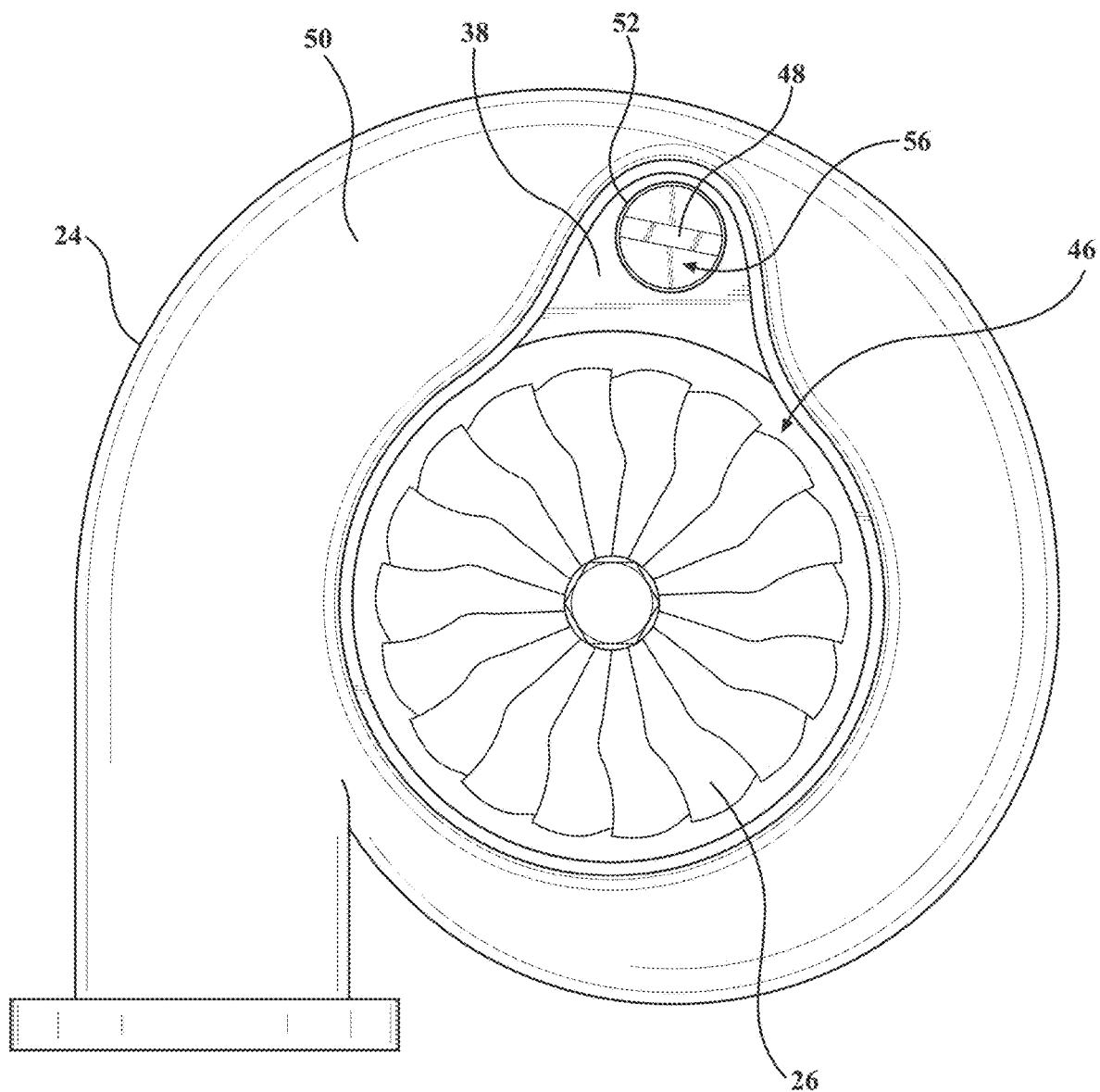
FIG. 3B is a top view of the turbine housing according to another embodiment, with the turbine housing including the wall and the valve seat, with the valve seat included on an interior surface of the turbine housing, and with the wall and the valve seat collectively defining the valve cavity.
Figure 4:
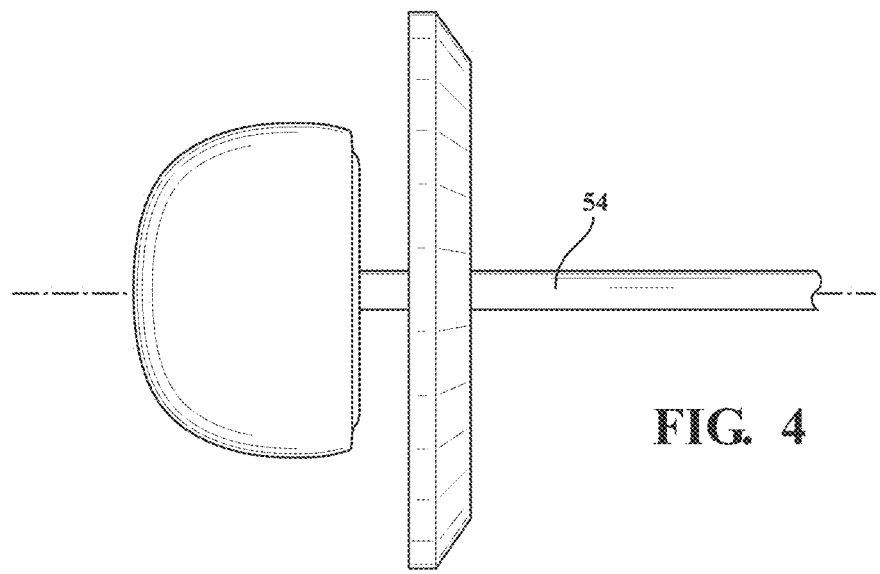
FIG. 4 is a side view of the valve of the dual volute turbocharger.

As shown in FIG. 2, the turbine housing 24 includes a turbine housing interior 40. The turbine housing interior 40 is adapted to receive the turbine wheel 26. The turbine housing 24 also includes a first volute 42, and a second volute 44. The first and second volutes 42, 44 are each adapted for fluid communication with the internal combustion engine 22 and the turbine housing interior 40 for delivering exhaust gas from the internal combustion engine 22 to the turbine housing interior 40. As shown in FIGS. 1, 3A and 3B, the turbine housing 24 also includes a turbine housing outlet 46. The turbine housing outlet 46 is in fluid communication with the turbine housing interior 40 for discharging exhaust gas from the turbine housing interior 40. With reference again to FIG. 2, the turbine housing 24 also includes a wall 48 separating the first volute 42 from the second volute 44. The turbine housing 24 may be comprised of any suitable metal or other suitable material. Typically, the turbine housing 24 is comprised of metal.

As shown in FIGS. 3A and 3B, the turbine housing 24 includes a valve seat 52. Typically, the valve seat 52 has as circular configuration. However, it is to be appreciated that the valve seat 52 may have any configuration suitable for receiving a valve 54 of the dual volute turbocharger 20 that will be described in greater detail below. The wall 48 and the valve seat 52 may collectively define a valve cavity 56. The valve seat 52 may be included on an interior surface 38 of the turbine housing 24, as shown in FIG. 3A. Alternatively, the valve seat 52 may be included on an exterior surface 50 of the turbine housing 24, as shown in FIG. 3B.

With reference again to FIG. 2, the internal combustion engine 22 includes a plurality of cylinders 58. In the illustrated embodiment, the internal combustion engine 22 includes four cylinders 58. However, it is to be appreciated that the internal combustion engine 22 may include any number of cylinders 58. For example, the internal combustion engine 22 may include two cylinders 58, four cylinders 58, six cylinders 58, eight cylinders 58, or ten or more cylinders 58. The internal combustion engine 22 may have a V-engine configuration, a flat/boxer engine configuration, a W-engine configuration, an inline engine configuration, and the like. In the illustrated embodiment, the internal combustion engine 22 has an inline engine configuration. The internal combustion engine 22 includes a first group of cylinders 60 and a second group of cylinders 62. The first and second groups of cylinders 60, 62 each include half of the cylinders 58 that are included in the internal combustion engine 22. For example, when the internal combustion engine 22 includes four cylinders 58 as shown in FIG. 2, the first group of cylinders 60 includes two of the cylinders 58 and the second group of cylinders 62 includes the other two of the cylinders 58. The first and second groups of cylinders 60, 62 produce exhaust gas in a series of pulses corresponding to an exhaust stroke of each of the first and second groups of cylinders 60, 62. Timing of the exhaust stroke of the first group of cylinders 60 is different from timing of the exhaust stroke of the second group of cylinders 62 such that the first and second groups of cylinders 60, 62 alternate pulses of exhaust gas.

With continued reference to FIG. 2, typically the first group of cylinders 60 are in fluid communication with the first volute 42 and the second group of cylinders 62 are in communication with the second volute 44. In this manner, pulses of exhaust gas from the first and second groups of cylinders 60, 62 flow through the first and second volutes 42, 44, respectively, to the turbine housing interior 40, where the pulses of exhaust gas rotate the turbine wheel 26.

Figure 5:
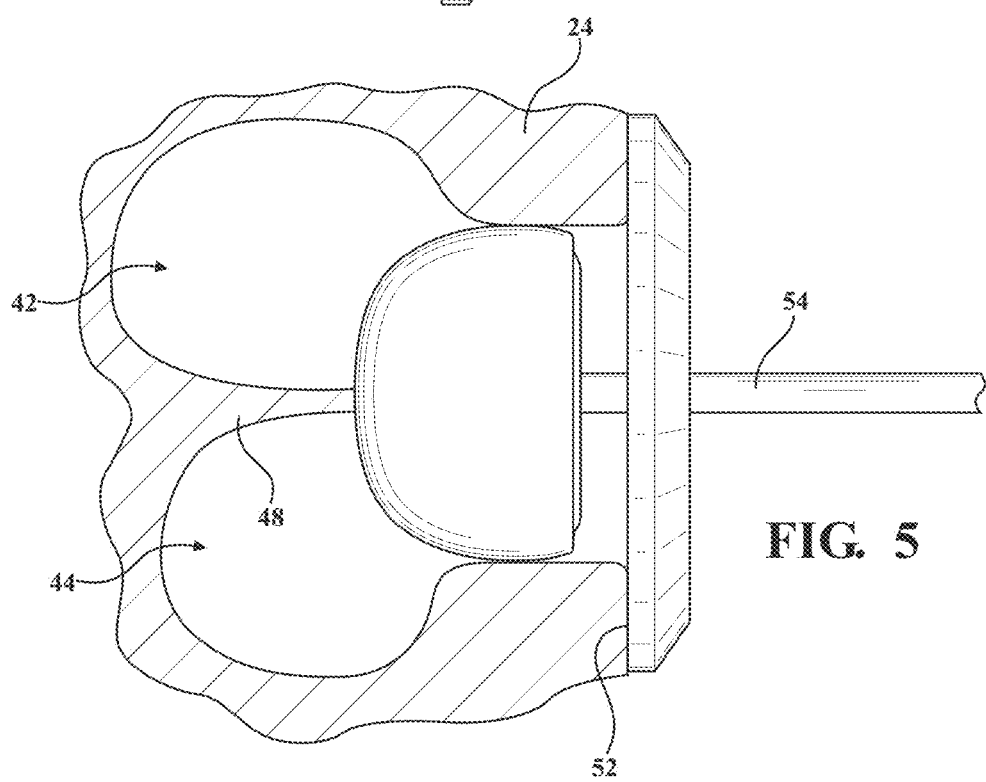
FIG. 5 is a cross-sectional view of the turbine housing of FIG. 3A, with the valve of FIG. 4 shown in a closed position where the valve restricts exhaust gas flow between the first and second volutes and restricts exhaust gas from bypassing the turbine housing interior.
Figure 6:
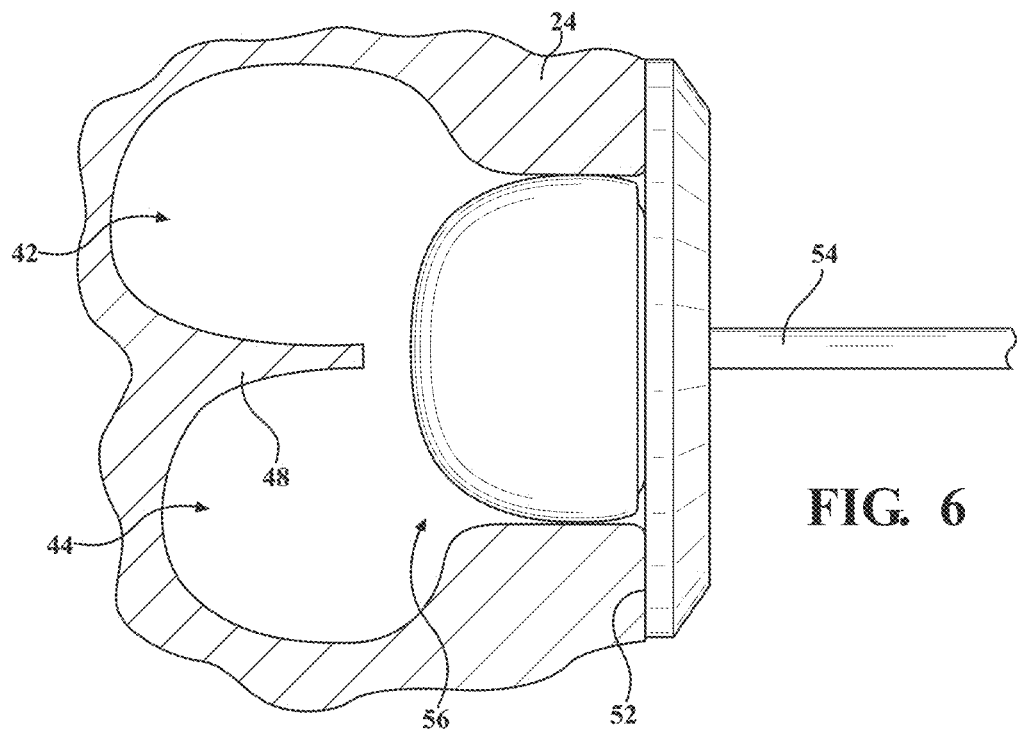
FIG. 6 is a cross-sectional view of the turbine housing of FIG. 3A, with the valve of FIG. 4 shown in a position where the valve allows exhaust gas flow between the first and second volutes and restricts exhaust gas from bypassing the turbine housing interior.
Figure 7:
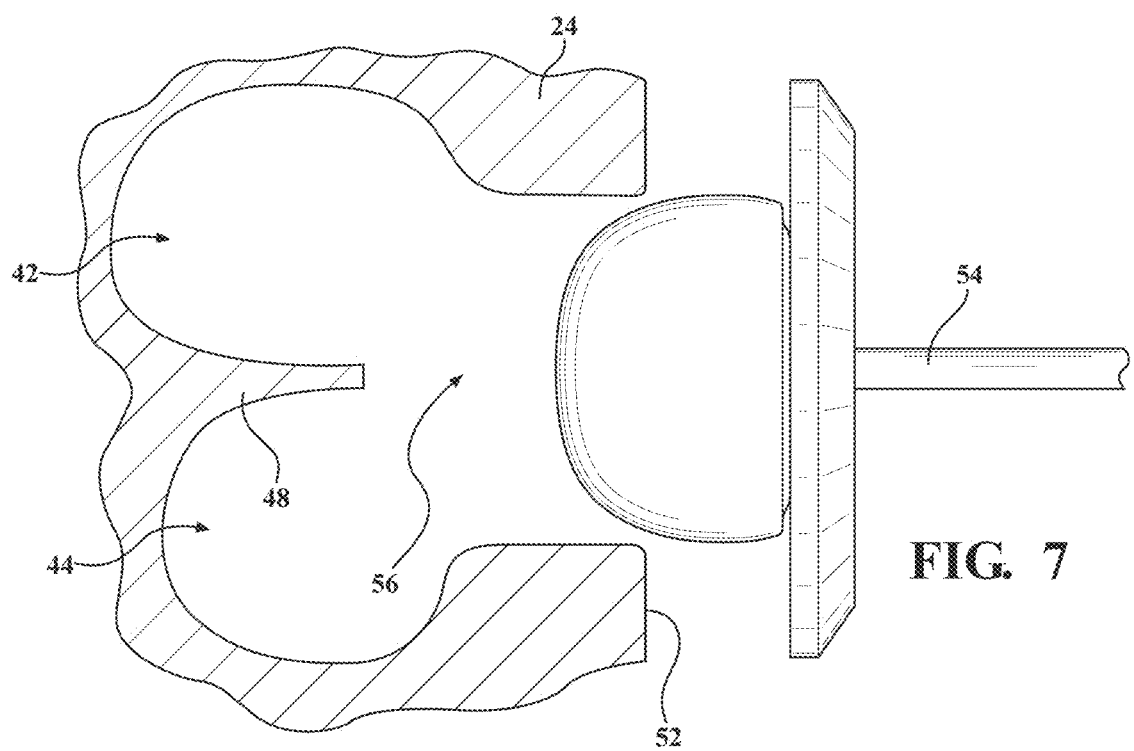
FIG. 7 is a cross-sectional view of the turbine housing of FIG. 3A, with the valve of FIG. 4 shown in another position where the valve allows exhaust gas flow between the first and second volutes and restricts exhaust gas from bypassing the turbine housing interior.
Figure 8:
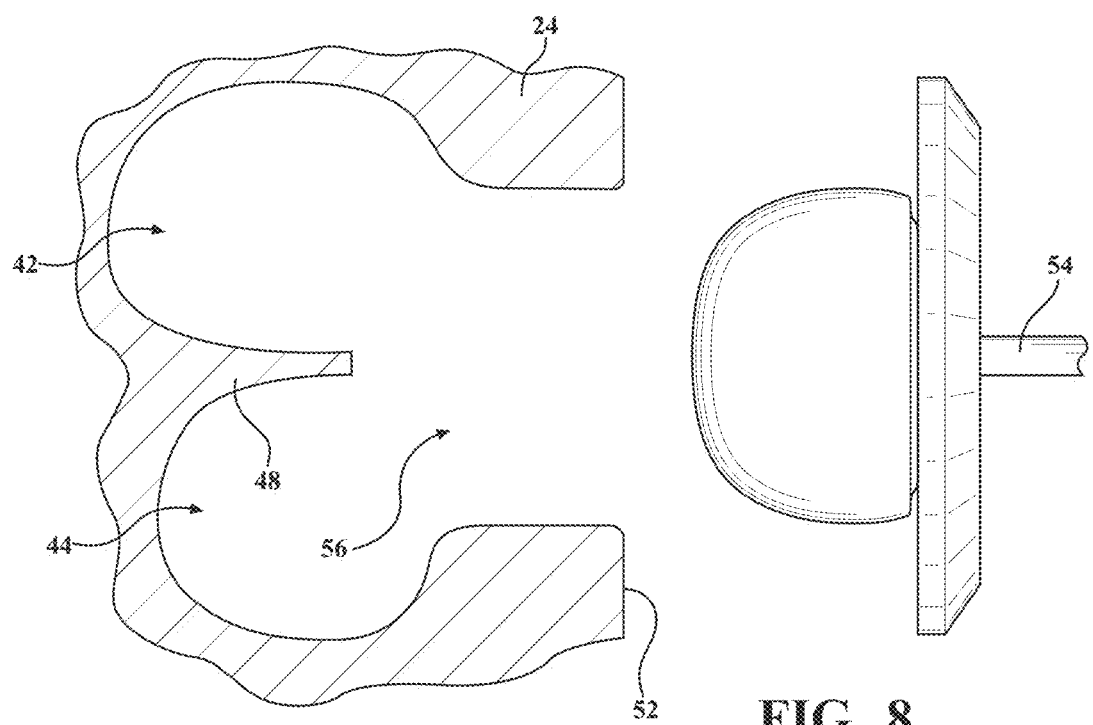
FIG. 8 is a cross-sectional view of the turbine housing of FIG. 3A, with the valve of FIG. 4 shown in an open position where the valve allows exhaust gas flow between the first and second volutes and allows exhaust gas to bypass the turbine housing interior.

With reference to FIGS. 4-8, the dual volute turbocharger 20 also includes a valve 54 that is engageable with at least one of the valve seat 52 and the wall 48 of the turbine housing for controlling exhaust gas flow from the first and second volutes 42, 44 to the turbine housing interior 40. The valve 54 and the wall 48 of the turbine housing 24 define a first cross-sectional flow area. The first cross-sectional flow area represents a cross-sectional area in which the exhaust gas is allowed to flow between the first and second volutes 42, 44. As such, if the first cross-sectional flow area is zero, exhaust gas is prevented by the valve 54 from flowing between the first and second volutes 42, 44, as shown in FIG. 5. Moreover, if the first cross-sectional flow area is non-zero (i.e., greater than zero), although exhaust gas may be restricted by the valve 54 from flowing between the first and second volute 42, 44, exhaust gas is able to flow between the first and second volutes 42, 44, as shown in FIG. 6. The valve 54 and the valve seat 52 of the turbine housing 24 define a second cross-sectional area. The second cross-sectional flow area represents a cross-sectional area in which the exhaust gas is allowed to bypass the turbine housing interior 40. As such, if the second cross-sectional flow area is zero, exhaust gas is prevented by the valve 54 from bypassing the turbine housing interior 40, as shown in FIGS. 5 and 6. Moreover, if the second cross-sectional flow area is non-zero (i.e., greater than zero), although exhaust gas may be restricted by the valve 54 from bypassing the turbine housing interior 40, exhaust gas is able to bypass the turbine housing interior 40, as shown in FIGS. 7 and 8.

The valve 54 is movable between a closed position, shown in FIG. 5, and an open position, shown in FIG. 8. Typically, the dual volute turbocharger 20 includes an actuator operable coupled to the valve 54 for moving the valve 54 between the closed and open positions. The actuator may be an electric actuator or a pneumatic actuator. With reference to FIG. 5, when the valve 54 is in the closed position, the valve 54 restricts exhaust gas from flowing between the first and second volutes 42, 44 and also restricts exhaust gas from bypassing the turbine housing interior 40. In the closed position, the valve 54 may be engaged with the wall 48 and/or the valve seat 52, thereby preventing exhaust gas from flowing between the first and second volutes 42, 44 and also preventing exhaust gas from bypassing turbine housing interior 40. Alternatively, in the closed position the valve 54 may be in close proximity to the wall 48 and/or the valve seat 52 such that the valve 54 restricts exhaust gas from flowing between the first and second volutes 42, 44 and also restricts exhaust from bypassing the turbine housing interior 40 without engaging the wall 48 and/or valve seat 52. In the closed position, the valve 54 is at least partially disposed in the valve cavity 56.

With reference to FIG. 8, when the valve 54 is in the open position, the valve 54 allows exhaust gas from the first and second volutes 42, 44 to bypass said turbine housing interior 40. In the open position, the valve 54 is disposed outside of the valve cavity 56 and spaced from the valve seat 52 of the turbine housing 24 to allow exhaust gas from the first and second volutes 42, 44 to bypass the turbine housing interior 40. Specifically, exhaust gas can flow from both of the first and second volutes 42, 44 through the valve cavity 56 to an environment outside of the turbine housing 24, bypassing the turbine housing interior 40, because the valve 54 is disposed outside of the valve cavity 56 and is spaced from the valve seat 52. Accordingly, when the valve 54 is in the open position, pulses of exhaust gas from the first and second groups of cylinders 60, 62 flow through the first and second volutes 42, 44, respectively, and through the valve cavity 56 to an environment outside of the turbine housing 24, thereby bypassing the turbine housing interior 40.

The configuration of the turbine housing 24 and the valve 54 is not particularly limited. In one embodiment, the turbine housing 24 and the valve 54 are described in DE Patent Application No. 20 2018 101 705.5, which published as DE 20 2018 101 705 U1 and is hereby incorporated by reference in its entirety. In another embodiment, the turbine housing 24 and the valve 54 are described in U.S. Provisional Patent Application No. 62/806,434 titled "Valve Assembly For A Dual Volute Turbocharger And Dual Volute Turbocharger Including The Same", which was filed on Feb. 15, 2019 and is hereby incorporated by reference in its entirety.

With reference again to FIG. 1, the dual volute turbocharger 20 includes a controller 64. The controller 64 is operable to receive at least one signal from at least one sensor 66, with the at least one signal corresponding to at least one operating value related to the internal combustion engine 22 and/or the dual volute turbocharger 20. The controller 64 is also operable to direct the valve 54 based on the at least one operating value. The controller 64 may include one or more processors, or microprocessors, for processing instructions stored in memory 68 to direct the valve 54 based on the at least one operating value. Such instructions may be any of the functions, algorithms or techniques described herein performed by the controller 64. Additionally or alternatively, the controller 64 may comprise one or more microcontrollers, field programmable gate arrays, systems on a chip, discrete circuitry, and/or other suitable hardware, software, or firmware that is capable of carrying out the functions described herein. In some embodiments, the controller 64 is an engine control unit (ECU) that directs the valve 54 in addition to controlling various other components of the dual volute turbocharger 20 and/or internal combustion engine 22. In other embodiments, the controller 64 is discrete from the ECU. With reference to FIG. 1, an engine system 70 may include the dual volute turbocharger 20, the internal combustion engine 22, and the controller 64. Typically, the engine system 70 also includes the at least one sensor 66.

The at least one sensor 66 is configured to detect the at least one signal from the dual volute turbocharger 20 and/or the internal combustion engine 22, and is in communication with the controller 64 for delivering the at least signal to the controller 64. It is to be appreciated that the at least one sensor 66 may detect and deliver more than one signal to the controller 64. In some embodiments, the at least one sensor 66 detects and delivers a first signal and a second signal to the controller 64. In other embodiments, the at least one sensor 66 detects and delivers first, second, and third signals to the controller 64. In still other embodiments, the at least one sensor 66 detects and delivers first, second, third, fourth, and fifth signals to the controller 64. It is to be further appreciated that the at least one sensor 66 may be more than one sensor 66, with each sensor 66 configured to detect and deliver one or more signals to the controller 64. For example, in some embodiments, the at least one sensor 66 may include a first sensor configured to detect and deliver a first signal to the controller 64, and a second sensor configured to detect and deliver a second signal to the controller 64. In other embodiments, the at least one sensor 66 may include first, second, and third sensors each configured to detect and deliver first, second, and third signals to the controller 64, respectively. In still other embodiments, the at least one sensor 66 may include first, second, third, fourth, and fifth sensors each configured to detect and deliver first, second, third, fourth, and fifth operating values to the controller 64, respectively.

The at least one sensor 66 is not particularly limited, and may be any sensor 66 suitable for detecting the at least one signal and delivering the at least one signal to the controller 64. Suitable examples of the at least one sensor 66 include, but are not limited to, pressure sensors, flow-rate sensors, temperature sensors, engine RPM sensors, throttle position sensors, valve position sensors, turbocharger shaft position sensors, turbocharger shaft speed sensors, accelerometers, and the like. In some embodiments, the at least one sensor 66 is a throttle position sensor. In other embodiments, the at least one sensor 66 is an engine RPM sensor. In still other embodiments, the at least one sensor 66 is an engine RPM sensor and a throttle position sensor.

The at least one operating value that corresponds to the at least one signal is not particularly limited, and may be any operating value related to the internal combustion engine 22 and/or the dual volute turbocharger 20. In some embodiments, the operating value is one of an exhaust gas pressure from the internal combustion engine 22 to the first volute 42, an exhaust gas flow rate from the internal combustion engine 22 to the first volute 42, an exhaust gas temperature from the internal combustion engine 22 to the first volute 42, an exhaust gas pressure from the internal combustion engine 22 to the second volute 44, an exhaust gas flow rate from the internal combustion engine 22 to the second volute 44, an exhaust gas temperature from the internal combustion engine 22 to the second volute 44, an exhaust gas pressure from the internal combustion engine 22 to both of the first and second volutes 42, 44, an exhaust gas flow rate from the internal combustion engine 22 to both of the first and second volutes 42, 44, an exhaust gas temperature from the internal combustion engine 22 to both of the first and second volutes 42, 44, a turbine energy of the dual volute turbocharger 20, a shaft power of the dual volute turbocharger 20, a compressor boost pressure of the dual volute turbocharger 20, an RPM of the internal combustion engine 22, a throttle position, a brake-specific fuel consumption (BSFC) of the internal combustion engine 22, a valve position, an amount of a particular constituent of the exhaust gas of the internal combustion engine 22, and the like. The turbine energy of the dual volute turbocharger 20, commonly referred to as turbine flow parameter or phi, is defined by the equation:

$$\text{Turbine Flow Parameter}(Phi) = \frac{\text{mass flow} \times \sqrt{\text{absolute temperature}}}{\text{absolute pressure}},$$

where
mass flow is exhaust gas flow rate in Kg/s from the internal combustion engine 22 to both of the first and second volutes 42, 44,
absolute temperature is exhaust gas temperature in Kelvin from the internal combustion engine 22 to both of the first and second volutes 42, 44, and
absolute pressure is exhaust gas pressure in kPa from the internal combustion engine 22 to both of the first and second volutes 42, 44.
The turbine energy of the dual volute turbocharger 20 is indicative of whether the dual volute turbocharger can receive the exhaust gas from the internal combustion engine 22 and provide a required amount of turbocharger shaft power to the compressor wheel 30 to achieve a compressor outlet boost pressure that is desired for operation of the internal combustion engine 22.

Figure 9:
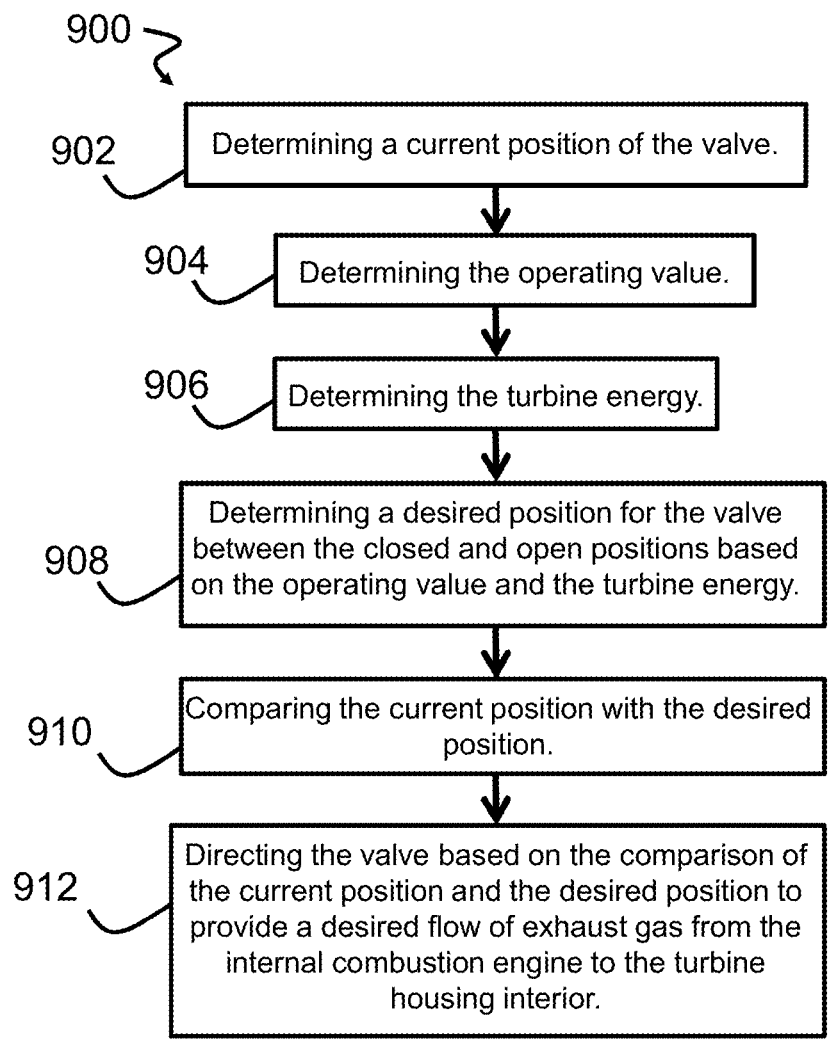
FIG. 9 is a flowchart of a method of controlling the valve according to one embodiment.

In some embodiments, the at least one signal corresponds to an operating value related to the internal combustion engine 22 and/or the dual volute turbocharger 20, and the at least one signal also corresponds to the turbine energy of the dual volute turbocharger 20. With reference to FIG. 9, in such embodiments, a method 900 of controlling the valve 54 of the dual volute turbocharger 20 includes the step 902 of determining a current position of the valve 54. The current position of the valve 54 may be determined in any suitable manner. In some embodiments, the at least one sensor 66 may include a valve position sensor that detects a signal corresponding to the current position of the valve 54 and delivers the signal to the controller 64. In other embodiments, each time the controller 64 directs the valve 54, the controller 64 stores a position that the valve 54 is directed to as the current position of the valve 54 in the memory 68 of the controller 64. In still other embodiments, the current position of the valve 54 may be determined based on an operating condition of the internal combustion engine 22. For example, the controller 64 may determine that the current position of the valve 54 is the closed position at engine start-up.

With continued reference to FIG. 9, the method 900 also includes the step 904 of determining the operating value and the step 906 of determining the turbine energy of the dual volute turbocharger 20. Typically, the operating value and the turbine energy are determined based on the at least one signal. As described above, the at least one signal corresponds to both the operating value and the turbine energy of the dual volute turbocharger 20. In the context of this disclosure, the term "corresponds to" means that the at least one signal detected by the at least one sensor 66 may directly or indirectly correspond to the operating value and the turbine energy. For example, when the at least one sensor 66 is a pressure sensor disposed in communication with the first volute 42 of the dual volute turbocharger 20, the at least one signal detected by the pressure sensor directly corresponds to an exhaust gas pressure in the first volute 42 (i.e., the operating value). In such instances, the operating value and/or the turbine energy is determined by the controller 64 when it receives the at least one signal from the at least one sensor 66. As another example, when the at least one sensor 66 is an engine RPM sensor, the at least one signal detected by the engine RPM sensor indirectly corresponds to the operating value and/or turbine energy of the dual volute turbocharger 20. In such instances, the controller 64 must first receive the at least one signal from the at least one sensor 66 and then compare the at least one signal to a look-up table or perform an algorithm to determine the operating value and/or the turbine energy of the dual volute turbocharger 20.

It is to be appreciated that the operating value and the turbine energy may be determined at the same time, or at different times. For example, the at least one sensor 66 may be a first sensor detecting and delivering a first signal to the controller 64 and a second sensor detecting and delivering a second signal to the controller 64. In such embodiments, the first and second signals may be delivered to the controller 64 simultaneously or sequentially so that the controller 64 can determine the operating value and the turbine energy simultaneously or sequentially. Typically, the operating value and turbine energy are determined simultaneously.

With reference again to FIG. 9, the method 900 further includes the step 908 of determining a desired position for the valve 54 between the closed and open positions based on the operating value and the turbine energy. In the context of this disclosure, the term "between the closed and open positions" includes the closed position and the open position. The desired position provides a desired flow of exhaust gas from the internal combustion engine 22 to the turbine housing interior 40. The desired position for the valve 54 may be determined in any suitable manner based on the operating value and the turbine energy of the dual volute turbocharger 20.

In some embodiments, the step 908 of determining the desired position for the valve 54 includes comparing the operating value and a first threshold value, and comparing the turbine energy and a second threshold value. The first and second threshold values may be stored in the memory 68 of the controller 64. The first and second threshold values may be a maximum or minimum value above or below which the dual volute turbocharger 20 and/or internal combustion engine 22 cannot safely and/or efficiently operate without risking damage to, or failure of, one or more components of the dual volute turbocharger 20 and/or the internal combustion engine 22, while meeting operating requirements for the internal combustion engine 22. For example, if the operating value is either the exhaust gas pressure from the internal combustion engine 22 to the first volute 42 or the exhaust gas pressure from the internal combustion engine 22 to the second volute 44, the threshold value may correspond to the maximum exhaust gas pressure allowed for the first and second volutes 42, 44, respectively, the valve 54, or the internal combustion engine 22 for safe and efficient operation of the dual volute turbocharger 20 and the internal combustion engine 22. In such an example, the exhaust gas pressure from the internal combustion engine 22 to the first or second volute 42, 44 and the maximum exhaust gas pressure allowed for the first and second volutes 42, 44, the valve 54, or the internal combustion engine 22 would be compared to determine the desired position for the valve 54. In this manner, the method 900 of controlling the valve 54 facilitates avoidance of inefficient operation or damage to, or failure of, one or more components of the dual volute turbocharger 20 and/or the internal combustion engine 22.

Alternatively, the first and second threshold values may be desired values at the time desired position for the valve 54 is being determined. For example, the second threshold value may be a desired value of the turbine energy, with the desired value of the turbine energy representing the turbine energy required by the compressor wheel 30 to deliver a desired intake manifold pressure to the internal combustion engine 22 to maximize efficiency and power output of the internal combustion engine 22. In such an example, the turbine energy and the desired turbine energy would be compared to determine the desired position for the valve 54. In this manner, the method 900 of controlling the valve 54 facilitates efficient operation of the dual volute turbocharger 20 and/or the internal combustion engine 22. Typically, the second threshold value is the desired turbine energy.

When the valve 54 is in the closed position (FIG. 5), as pulses of exhaust gas flow from the first and second groups of cylinders 60, 62 and through the first and second volutes 42, 44, respectively, the pulses of exhaust gas exert a back pressure on the internal combustion engine 22. Moreover, the pulses of exhaust gas may have a pressure that exceeds the maximum exhaust gas pressure allowed for the first and/or second volutes 42, 44, which increases the magnitude of the back pressure on the internal combustion engine 22. The desired position for the valve 54 determined in step 908 reduces back pressure on the internal combustion engine 22 while also maintaining sufficient turbine energy to the dual volute turbocharger 20. Specifically, the desired position for the valve 54 relieves back pressure on the internal combustion engine 22 by allowing the exhaust gas from the internal combustion engine 22 to flow between the first and second volutes 42, 44 and/or bypass the turbine housing interior 40.

In some embodiments, the operating value is one of the exhaust gas pressure, flow rate, or temperature from the internal combustion engine 22 to the first volute 42 and the exhaust gas pressure, flow rate, or temperature from the internal combustion engine 22 to the second volute 44. In such embodiments, when the operating value is less than the first threshold value and the turbine energy is greater than the second threshold value, the first cross-sectional flow area is non-zero and the second cross-sectional flow area is less than the first cross-sectional flow area in the desired position for the valve 54, as shown in FIGS. 6 and 7. In other words, with reference to FIGS. 6 and 7, the desired position for the valve 54 allows exhaust gas from the internal combustion engine 22 to flow between the first and second volutes 42, 44 while restricting, or preventing, exhaust gas from bypassing the turbine housing interior 40. Because the desired position for the valve 54 allows exhaust gas from the internal combustion engine 22 to flow between the first and second volutes 42, 44, the desired position may relieve backpressure on the internal combustion engine 22 and/or provide the required amount of turbine energy to the dual volute turbocharger 20. Although not required, the second cross-sectional flow area may be zero in the desired position for the valve 54 when the operating value is less than the first threshold and the turbine energy is greater than the second threshold, as shown in FIG. 6.

In some embodiments, the operating value is the exhaust gas pressure from the internal combustion engine 22 to both of the first and second volutes 42, 44. In such embodiments, the first threshold value is typically a maximum exhaust gas pressure allowed for the first and second volutes 42, 44. Moreover, in such embodiments, when the operating value is greater than the first threshold value and the first cross-sectional flow area is non-zero in the current position of the valve 54, the second cross-sectional flow area in the desired position for the valve 54 is greater than the second cross-sectional flow area in the current position of the valve 54. In other words, when the current position of the valve 54 allows for exhaust gas to flow between the first and second volutes 42, 44, as shown in FIGS. 6 and 7, and the exhaust gas pressure from the internal combustion engine 22 to both of the first and second volutes 42, 44 is greater than the maximum exhaust gas pressure allowed for the first and second volutes 42, 44, the desired position for the valve 54 is either the open position, as shown in FIG. 8, or another position where the valve 54 allows more exhaust gas to bypass the turbine housing interior 40 than the current position (e.g. FIG. 7 as compared to FIG. 6). Because the desired position for the valve 54 allows for more exhaust gas from the internal combustion engine 22 to bypass the turbine housing interior 40, the desired position may be used to relieve backpressure on the internal combustion engine 22 and avoid damage to, or failure of, one or more components of the dual volute turbocharger 20 and/or internal combustion engine 22.

As described above, in some embodiments, the step 908 of determining the desired position for the valve 54 may include comparing the operating value and the first threshold value, and comparing the turbine energy and the second threshold value. As also described above, typically the second threshold value is the desired turbine energy. In such embodiments, when the turbine energy of the dual volute turbocharger 20 exceeds the second threshold value and the first cross-sectional flow area is non-zero in the current position of the valve 54, the second cross-sectional flow area in the desired position for the valve 54 is greater than the second cross-sectional flow area in the current position of the valve 54. In other words, when the current position of the valve 54 allows for exhaust gas to flow between the first and second volutes 42, 44, as shown in FIGS. 6 and 7, and the turbine energy is greater than the desired turbine energy, the desired position for the valve 54 is either the open position, as shown in FIG. 8, or another position where the valve 54 allows more exhaust gas to bypass the turbine housing interior 40 than the current position (e.g. FIG. 7 as compared to FIG. 6). Because the desired position for the valve 54 allows for more exhaust gas from the internal combustion engine 22 to bypass the turbine housing interior 40, the desired position may be used to relieve backpressure on the internal combustion engine 22 and/or provide the required amount of turbine energy to the dual volute turbocharger 20, and avoid damage to, or failure of, one or more components of the dual volute turbocharger 20 and/or internal combustion engine 22.

In some embodiments, the valve 54 has an area ratio constant ($C_{AR}$) of from 0.0001 L/kW to 0.150 L/kW in the desired position, with the $C_{AR}$ defined by the equation:

Area Ratio Constant ($C_{AR}$)=the first cross-sectional flow area/($\rho_{power}$*the second cross-sectional flow area), where $\rho_{power}$ is the power density in kW/L of the internal combustion engine 22.

The $C_{AR}$ of from 0.0001 L/kW to 0.150 L/kW may optimize the BSFC of the internal combustion engine 22 by balancing the efficiency of the dual volute turbocharger 20 and the internal combustion engine 22 while also reducing the backpressure on the internal combustion engine 22. This optimization of the BSFC lowers fuel consumption of the internal combustion engine 22 during operation of the internal combustion engine 22 and the dual volute turbocharger 20. In other embodiments, the valve 54 has a $C_{AR}$ of from 0.0001 to 0.100, or of from 0.0001 to 0.060 L/kW.

In embodiments where the valve 54 has the $C_{AR}$ of from 0.0001 L/kW to 0.150 L/kW in the desired position, the controller 64 determines the desired position for the valve 54 based at least partially on the $C_{AR}$. As an example, when the turbine energy exceeds the second threshold value and the first cross-sectional flow area is non-zero in the current position of the valve 54, the controller 64 determines that the second cross-sectional flow area in the desired position for the valve 54 is greater than the second cross-sectional flow area in the current position of the valve 54. In such instances, the desired position for the valve 54 will have the $C_{AR}$ of from 0.0001 L/kW to 0.150 L/kW in addition to the second cross-sectional flow area being greater in the desired position than in the current position. In this manner, the method 900 for controlling the valve 54 facilitates avoidance of damage to, or failure of, one or more components of the dual volute turbocharger 20 and/or the internal combustion engine 22 while optimizing the BSFC of the internal combustion engine 22.

With reference again to FIG. 9, the method 900 also includes a step 910 of comparing the current position and the desired position. The method 900 further includes a step 912 of directing the valve 54 based on the comparison of the current position and the desired position to provide a desired flow of exhaust gas from the internal combustion engine 22 to the turbine housing interior 40. Typically, the step 910 of comparing the current position and the desired position includes determining whether the current position is different from the desired position. If the current position is different from the desired position, the controller 64 directs the valve to the desired position in the step 912 of directing the valve 54. If the current position is not different (i.e., is the same as) the desired position, the controller 64 directs the valve 54 to remain in the current position in the step 912 of directing the valve 54. When the dual volute turbocharger 20 includes the actuator, the controller 64 may direct the valve 54 by communicating with the actuator. Typically, the controller 64 updates the current position of valve 54 in the memory 68 after the step 912.

Figure 10:
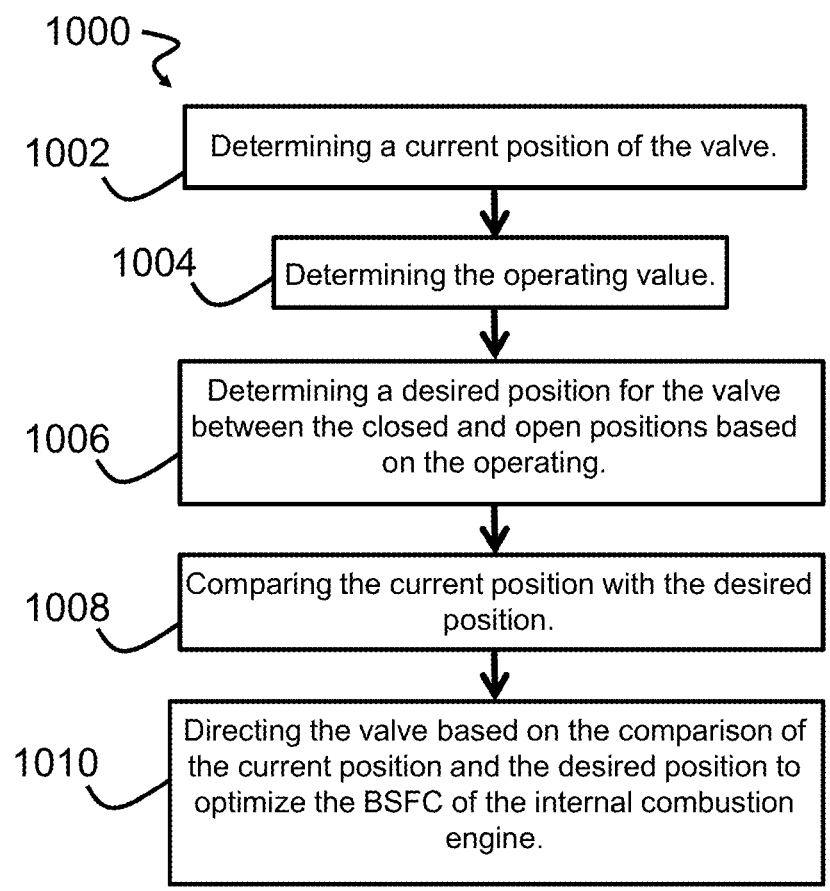
FIG. 10 is a flowchart of the method of controlling the valve according to another embodiment.

In some embodiments, the at least one signal corresponds to an operating value related to the BSFC of the internal combustion engine 22. The operating value related to the BSFC of the internal combustion engine 22 may be any one of the operating values descried above. With reference to FIG. 10, in such embodiments, a method 1000 of controlling the valve 54 of the dual volute turbocharger 20 includes the step 1002 of determining a current position of the valve 54. The step 1000 of determining a current position of the valve 54 is the same as the step 902 described above for the method 900. The method 1000 also includes the step 1004 of determining the operating value. The step 1004 of determining the operating value is the same as the step 904 described above for the method 900.

With continued reference to FIG. 10, the method 1000 further includes the step 1006 of determining a desired position for the valve 54 between the closed and open positions based on the operating value. As described above, in the context of this disclosure, the term "between the closed and open positions" includes the closed position and the open position. The desired position for the valve 54 optimizes the BSFC of the internal combustion engine 22. The desired position for the valve 54 may be determined in any suitable manner based on the operating value.

In some embodiments, the step 1006 of determining the desired position for the valve 54 may include comparing the operating value and a threshold value. The threshold value may be stored in the memory 68 of the controller 64. The threshold value may be a maximum or minimum value above or below which the dual volute turbocharger 20 and/or internal combustion engine 22 cannot safely or efficiently operate without risking damage to, or failure of, one or more components of the dual volute turbocharger 20 and/or the internal combustion engine 22. For example, if the operating value is either the exhaust gas pressure from the internal combustion engine 22 to the first volute 42 or the exhaust gas pressure from the internal combustion engine 22 to the second volute 44, the threshold value may correspond to the maximum exhaust gas pressure allowed for the first and second volutes 42, 44, respectively, the valve 54, or the internal combustion engine 22 for safe and efficient operation of the dual volute turbocharger 20 and the internal combustion engine 22. In such an example, the exhaust gas pressure from the internal combustion engine 22 to the first or second volute 42, 44 and the maximum exhaust gas pressure allowed for the first and second volutes 42, 44, the valve 54, or the internal combustion engine 22 would be compared to determine the desired position for the valve 54. In this manner, the method 1000 of controlling the valve 54 facilitates inefficient operation or avoidance of damage to, or failure of, one or more components of the dual volute turbocharger 20 and/or the internal combustion engine 22.

Alternatively, the threshold value may be a desired value at the time the desired position for the valve 54 is being determined. For example, the first threshold value may be a desired value of turbine energy, with the desired value of turbine energy representing the turbine energy required by the compressor wheel 30 to deliver a desired intake manifold pressure to the internal combustion engine 22 to optimize the BSFC of the internal combustion engine 22. In such an example, the turbine energy and the desired turbine energy would be compared to determine the desired position for the valve 54. In this manner, the method 1000 of controlling the valve 54 facilitates optimization of the BSFC of the internal combustion engine 22. It is to be appreciated that the operating value may be any of the operating value described above, and that the threshold value may be any desired value of the operating value that optimizes the BSFC of the internal combustion engine 22 and/or facilitates avoidance of damage to, or failure of, one or more components of the dual volute turbocharger 20 and/or the internal combustion engine 22.

In some embodiments, the step 1006 of determining the desired position for the valve 54 includes comparing the operating value and a primary threshold value and comparing the operating value and a secondary threshold value. In such embodiments, when the operating value is greater than the primary threshold value and less than the secondary threshold value, the first cross-sectional flow area is non-zero in the desired position for the valve 54 and the second cross-sectional flow area is less than the first cross-sectional flow area in the desired position for the valve 54. The second cross-sectional flow area may be zero when the operating value is greater than the primary threshold value and less than the secondary threshold value, as shown in FIG. 6.

Furthermore, when the operating value is greater than both the primary and secondary threshold values, the first and second cross-sectional flow areas are non-zero in the desired position. For example, if the operating value is exhaust gas pressure from the internal combustion engine 22 to both the first and second volutes 42, 44, the primary threshold value may represent a pressure where back pressure on the internal combustion engine 22 can be relieved by allowing exhaust gas from the internal combustion engine 22 to flow between the first and second volutes 42, 44. Moreover, the secondary threshold value may represent a pressure where back pressure on the internal combustion engine 22 can be relieved by allowing exhaust gas from the internal combustion engine 22 to bypass the turbine housing interior 40. In such an example, when the exhaust gas pressure from the internal combustion engine 22 to both the first and second volutes 42, 44 is greater than the primary threshold value and less than the secondary threshold value, the desired position of the valve 54 allows for exhaust to flow between the first and second volutes 42, 44 while restricting, or preventing, exhaust gas from bypassing the turbine housing interior 40, as shown in FIGS. 6 and 7. Moreover, when the exhaust gas pressure from the internal combustion engine 22 to both the first and second volutes 42, 44 is greater than the primary and secondary threshold values, the desired position the valve 54 allows for exhaust gas to bypass the turbine housing interior 40 (e.g. the open position in FIG. 8). In this manner, the method 1000 of controlling the valve 54 facilitates optimization of the BSFC of the internal combustion engine 22 and also avoidance of damage to, or failure of, one or more components of the dual volute turbocharger 20 and/or the internal combustion engine 22.

In some embodiments, the valve 54 has a $C_{AR}$ of from 0.0001 L/kW to 0.150 L/kW in the desired position. In other embodiments, the valve 54 has a $C_{AR}$ of from 0.0001 to 0.100, or of from 0.0001 to 0.060 L/kW.

In embodiments where the valve 54 has the $C_{AR}$ of from 0.0001 L/kW to 0.150 L/kW in the desired position, the controller 64 determines the desired position for the valve 54 based at least partially on the $C_{AR}$ of the valve 54. As an example, when the operating value is greater than the primary threshold value and less than the secondary threshold value, the controller 64 determines that the first cross-sectional flow area is non-zero in the desired position for the valve 54 and the second cross-sectional flow area is less than the first cross-sectional flow area in the desired position for the valve 54. In such instances, the desired position for the valve 54 will have the $C_{AR}$ of from 0.0001 L/kW to 0.150 L/kW in addition to the first cross-sectional flow area being non-zero and the second cross-sectional flow area being less than the first cross-sectional flow area in the desired position for the valve 54. In this manner, the method 1000 for controlling the valve 54 facilitates optimization of the BSFC of the internal combustion engine 22 and also facilitates avoidance of damage to, or failure of, one or more components of the dual volute turbocharger 20 and/or the internal combustion engine 22.

With reference again to FIG. 10, the method 1000 further includes the step 1008 of comparing the current position and the desired position. The step 1008 of comparing the current position and the desired position is the same as the step 910 described above for the method 900. The method 1000 further includes the step 1010 of directing the valve 54 based on comparing the current position and the desired position to optimize the BSFC of the internal combustion engine 22. The step 1010 of directing the valve 54 based on comparing the current position and the desired position is the same as the step 912 described above for the method 900. Typically, the controller 64 updates the current position of valve 54 in the memory 68 after the step 1010.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of controlling a valve of a dual volute turbocharger for use with an internal combustion engine, with the dual volute turbocharger configured to receive exhaust gas from the internal combustion engine and deliver compressed air to the internal combustion engine, the dual volute turbocharger comprising,
    a turbine housing comprising,
        a turbine housing interior adapted to receive a turbine wheel,
        a first volute adapted for fluid communication with the internal combustion engine and the turbine housing interior for delivering exhaust gas from the internal combustion engine to the turbine housing interior,
        a second volute adapted for fluid communication with the internal combustion engine and the turbine housing interior for delivering exhaust gas from the internal combustion engine to the turbine housing interior independently of the first volute, and
        a turbine housing outlet in fluid communication with the turbine housing interior for discharging exhaust gas from the turbine housing interior,
        a wall separating the first volute from the second volute,
        a valve seat,
        the turbine wheel disposed in the turbine housing interior, and
        a valve engageable with at least one of the valve seat and the wall of the turbine housing for controlling exhaust gas flow from the first and second volutes to the turbine housing interior, with the valve and the wall of the turbine housing collectively defining a first cross-sectional flow area and the valve and the valve seat of the turbine housing collectively defining a second cross-sectional flow area, and with the valve movable between a closed position where the valve restricts exhaust gas from flowing between the first and second volutes and from bypassing the turbine housing interior, and an open position where the valve allows exhaust gas from the first and second volutes to bypass the turbine housing interior, and
    a controller operable to
        receive at least one signal from at least one sensor, with the at least one signal corresponding to an operating value related to the internal combustion engine and/or the dual volute turbocharger, and with the at least one signal corresponding to a turbine energy of the dual volute turbocharger, and
        direct the valve based on the operating value and the turbine energy of the dual volute turbocharger,
    said method comprising the steps of:
        determining a current position of the valve;
        determining the operating value;
        determining the turbine energy of the dual volute turbocharger;
        determining a desired position for the valve between the closed and open positions based on the operating value and the turbine energy of the dual volute turbocharger for providing a desired flow of exhaust gas from the internal combustion engine to the turbine housing interior;
        comparing the current position of the valve and the desired position for the valve; and
        directing the valve based on the comparison of the current position and the desired position to provide the desired flow of exhaust gas from the internal combustion engine to the turbine housing interior,
    wherein when the valve is in the desired position, the valve has an area ratio constant ($C_{AR}$) of from 0.0001 L/kW to 0.150 L/kW, with the $C_{AR}$ defined by the equation: $C_{AR}$=first cross-sectional flow area/ ($\rho_{power}$*second cross-sectional flow area).

2. The method as set forth in claim 1, wherein the operating value is one of:
    an exhaust gas pressure from the internal combustion engine to the first volute,
    an exhaust gas flow rate from the internal combustion engine to the first volute,
    an exhaust gas temperature from the internal combustion to the first volute,
    an exhaust gas pressure from the internal combustion engine to the second volute,
    an exhaust gas flow rate from the internal combustion engine to the second volute,
    an exhaust gas temperature from the internal combustion to the second volute,
    an exhaust gas pressure from the internal combustion engine to both of the first and second volutes,
    an exhaust gas flow rate from the internal combustion engine to both of the first and second volutes, and
    an exhaust gas temperature from the internal combustion engine to both of the first and second volutes.

3. The method as set forth in claim 1, wherein the step of determining the desired position for the valve further comprises,
    comparing the operating value and a first threshold value, and
    comparing the turbine energy of the dual volute turbocharger and a second threshold value.

4. The method set forth in claim 3, wherein the operating value is one of the exhaust gas pressure, flow rate, or temperature from the internal combustion engine to the first volute and the exhaust gas pressure, flow rate, or temperature from the internal combustion engine to the second volute.

5. The method as set forth in claim 4, wherein when the operating value is less than the first threshold value and the turbine energy of the dual volute turbocharger is greater than the second threshold value, the first cross-sectional flow area is non-zero in the desired position for the valve and the second cross-sectional flow area is less than the first cross-sectional flow area in the desired position for the valve.

6. The method as set forth in claim 5, wherein the second cross-sectional flow area is zero in the desired position for the valve.

7. The method as set forth in claim 3, wherein the operating value is the exhaust gas pressure from the internal combustion engine to both of the first and second volutes.

8. The method as set forth in claim 7, wherein when the operating value exceeds the first threshold value and the first cross-sectional flow area is non-zero in the current position of the valve, the second cross-sectional flow area in the desired position for the valve is greater than second cross-sectional flow area in the current position of the valve.

9. The method as set forth in claim 3, wherein when the turbine energy of the dual volute turbocharger exceeds the second threshold value and the first cross-sectional flow area is non-zero in the current position of the valve, the second cross-sectional flow area in the desired position for the valve is greater than the second cross-sectional flow area in the current position of the valve.

10. A method of controlling a valve of a dual volute turbocharger for use with an internal combustion engine, with the dual volute turbocharger configured to receive exhaust gas from the internal combustion engine and deliver compressed air to the internal combustion engine, the dual volute turbocharger comprising,
   a turbine housing comprising,
      a turbine housing interior adapted to receive a turbine wheel,
      a first volute adapted for fluid communication with the internal combustion engine and the turbine housing interior for delivering exhaust gas from the internal combustion engine to the turbine housing interior,
      a second volute adapted for fluid communication with the internal combustion engine and the turbine housing interior for delivering exhaust gas from the internal combustion engine to the turbine housing interior independently of the first volute, and
      a turbine housing outlet in fluid communication with the turbine housing interior for discharging exhaust gas from the turbine housing interior,
      a wall separating the first volute from the second volute,
      a valve seat,
      the turbine wheel disposed in the turbine housing interior, and
   a valve engageable with at least one of the valve seat and the wall of the turbine housing for controlling exhaust gas flow from the first and second volutes to the turbine housing interior, with the valve and the wall of the turbine housing collectively defining a first cross-sectional flow area and the valve and the valve seat of the turbine housing collectively defining a second cross-sectional flow area, and with the valve movable between a closed position where the valve restricts exhaust gas from flowing between the first and second volutes and from bypassing the turbine housing interior, and an open position where the valve allows exhaust gas from the first and second volutes to bypass the turbine housing interior, and
   a controller operable to
   receive a signal from a sensor, with the signal corresponding to an operating value related to the brake-specific fuel consumption (BSFC) of the internal combustion engine, and
   direct the valve based on the operating value,
   said method comprising the steps of:
   determining a current position of the valve;
   determining the operating value;
   determining a desired position for the valve between the closed and open positions based on the operating value for optimizing the BSFC of the internal combustion engine; and
   comparing the current position of the valve and the desired position for the valve; and
   directing the valve based on comparing the current position and the desired position to optimize the BSFC of the internal combustion engine,
   wherein when the valve is in the desired position, the valve has an area ratio constant ($C_{AR}$) of from 0.0001 L/kW to 0.150 L/kW, with the $C_{AR}$ defined by the equation: $C_{AR}$=first cross-sectional flow area/($\rho_{power}$*second cross-sectional flow area).

11. The method as set forth in claim 10, wherein the step of determining the desired position for the valve further comprises,
   comparing the operating value and a threshold value.

* * * * *